United States Patent [19]

Sano et al.

[11] Patent Number: 4,599,024
[45] Date of Patent: Jul. 8, 1986

[54] ENTERING END PORTION OF DRILL SCREW

[75] Inventors: Nariaki Sano; Tetsuo Amano, both of Kyoto, Japan

[73] Assignee: Kabushiki Kaisha Yamashina Seikosho, Kyoto, Japan

[21] Appl. No.: 571,713

[22] Filed: Jan. 18, 1984

Related U.S. Application Data

[63] Continuation-in-part of Ser. No. 399,253, Jul. 19, 1982, abandoned, which is a continuation of Ser. No. 2,365, Jan. 10, 1979, abandoned.

[30] Foreign Application Priority Data

Jan. 18, 1978 [JP] Japan .................................. 53-3456

[51] Int. Cl.$^4$ ........................................... F16B 25/00
[52] U.S. Cl. .................................... 411/387; 408/228
[58] Field of Search ............... 411/387, 386; 10/152 T, 10/9; 408/228, 229

[56] References Cited

U.S. PATENT DOCUMENTS

| | | | |
|---|---|---|---|
| 3,079,831 | 3/1963 | Gutshall | 411/387 |
| 3,318,182 | 5/1967 | Carlson | 411/387 |
| 3,395,603 | 8/1968 | Skierski | 411/387 |
| 3,645,641 | 2/1972 | Jae Sun Kim | 408/199 |
| 3,786,713 | 1/1974 | Sygnator | 411/387 |
| 3,789,725 | 2/1974 | Lindstrom | 411/387 |
| 3,827,331 | 8/1974 | Muenchinger | 411/387 |
| 4,147,088 | 4/1979 | Whittaker | 411/387 |

FOREIGN PATENT DOCUMENTS 1316157  5/1973  United Kingdom ................ 411/387

Primary Examiner—Thomas J. Holko
Attorney, Agent, or Firm—Charles E. Brown; Charles A. Brown

[57] ABSTRACT

A drill screw having an integral driving shank, head, and entering end portion. The shank has formed on it thread convolutions of uniform outer and root diameters. The entering end portion has a cylindrical portion coaxial with the shank provided with two flutes inclined with respect to the center axis of the cylindrical portion and disposed on opposite sides of it, and end surfaces of roof-shape. Each of the flutes includes conical flute surfaces. The intersection of each of the conical flute surfaces and each of the end surfaces forms a cutting edge. And each of the conical flute surfaces forms a rake angle with respect to one of the cutting edges, while each of the end surfaces forms a relief angle with respect to one of the cutting edges.

In a preferred construction each fluted surface is located outside or beyond a plane containing the center axis of the drill screw, and the fluted surfaces each have a vertex angle of 35° to 54°.

6 Claims, 10 Drawing Figures

ENTERING END PORTION OF DRILL SCREW

CROSS-REFERENCE TO RELATED APPLICATIONS

This application is a continuation-in-part of application Ser. No. 399,253, filed July 19, 1982, now abandoned, which is a continuation of Ser. No. 002,365, filed Jan. 10, 1979, now abandoned.

BACKGROUND OF THE INVENTION (i) Field of the Invention

This invention relates to a drill screw.

(ii) Description of the Prior Art

A drill screw comprises an elongated shank having integrally formed thread convolutions of a substantially uniform outer diameter and a substantially uniform root diameter; a head is disposed at one end of the shank and is provided with means for interengaging a tool to turn or drive the screw into a workpiece and an entering end portion or drill tip is disposed at the other end of the shank.

This type of drill screw has the function of opening a hole in a workpiece, cutting female threads in the hole and screwing the workpiece in place in a single operation.

Thus no separate operations of boring or countersinking are employed when using a drill screw; and the drill screw forms the hole and screws itself into place in a single operation.

When this type of drill screw is used, it is usual practice to screw a workpiece in place by using a large number of drill screws.

It is thus desirable to employ drill screws which can be driven into the workpiece rapidly so that the operation can be completed in a short period of time.

A particular problem faced by users of drill screws is the hole forming ability of the drill screw, and this affects the overall operation efficiency; for example, chips of metal formed in the cutting or hole forming tend to be trapped between the drill screw and the partially formed hole. Such chips may cause jamming such as will prevent further hole opening operation of the drill screw.

If the drill screw can not be freed from the jamming chips it is left in a partially screwed in position and a new attempt made to drill in a drill screw in an adjacent location.

The jamming can sometimes be overcome by increased thrust applied to the drill screw, however this makes the drilling operation more arduous, and the person drilling becomes fatigued in a shorter period. Another problem is that application of a larger thrust may overload the motor of the drill screw appliance.

The thrust which is required to cause a drill screw to penetrate a workpiece, the time required for the drill screw to effect such penetration and the efficiency with which the drill screw can fasten the workpiece in place are all governed by the ability of the drill screw to form the hole.

If the hole forming ability of a drill screw is low, then a thrust of a larger magnitude and for a longer period of time will be required, than are normally required to cause the drill screw to penetrate the workpiece. In this event, difficulties are encountered in fixing the workpiece in place and consequently overall efficiency is lowered.

Known drill screws also have the drawback that the flutes are choked with chips produced in drilling a workpiece of aluminium and further drilling becomes impossible.

In a known drill screw described by reference to FIG. 6 of U.S. Pat. No. 4,147,088, Whittaker (presented as FIG. 3 in this specification), chips flowing on the cutting surface 52 in the direction shown by the arrow in FIG. 3 run against the drag surface 54 once and are discharged thereafter. In view of the resistance and the relatively small volume of the flutes the chips are not efficiently discharged.

U.S. Pat. No. 3,786,713, Sygnator, describes a drill screw shown in FIG. 4, in which the flutes of the screw are provided with protrusions for breaking chips into small pieces. These protrusions provide a high resistance to flowing chips and the chips thus cause jamming, which interferes with the efficient operation.

Generally, the entering end portion or drill tip of the drill screw comprises a cylindrical portion coaxial with the shank of the drill screw, two flute surfaces formed in the cylindrical portion in such a manner that they are inclined with respect to the center axis of the cylindrical portion, the flute surfaces being disposed on opposite sides of such center axis, and the cylindrical portion having end surfaces in the form of a roof.

The entering end portion or drill tip of a drill screw may be formed by two processes: machining and forging or pinch pointing. Drill screws produced by machining are superb in drilling efficiency but high in cost. Drill screws produced by forging or pinch pointing can be produced at low cost but are inferior in drilling efficiency as compared with machined drill screws.

SUMMARY OF THE INVENTION

One object of this invention is the provision of a drill screw having flutes along which chips produced during the drilling of a workpiece can be smoothly discharged and especially being adapted for drilling into malleable material, for example aluminium.

It is a further object of the invention to provide such a drill screw having a speedy drilling ability and requiring a small thrust to cause the drill screw to penetrate the workpiece.

Another object of the invention is to provide a drill screw of the type described in which the entering end portion or drill tip can be produced by forging or pinch pointing and, therefore, is durable and commercially massproducible, while having a high drilling efficiency comparable with the more costly machined drill tips.

In accomplishing the aforesaid objects, the invention provides a drill screw having an entering end portion in which the opposed flute surfaces form means effective to provide rapid discharge of chips produced during a drilling operation in the form of a coil. In particular, each flute surface includes an at least in part substantially conical flute surface; the intersection of a flute surface and the end surface of a cylindrical portion of the drill screw forming a cutting edge. Preferably the flute surfaces are conical throughout.

Thus in accordance with the invention there is provided a drill screw comprising a shank a head, and an entering end portion formed integrally with one another, wherein the shank has formed thereon thread convolutions of substantially uniform outer diameter and substantially uniform root diameter, the head is disposed at one end of the shank and is provided with means for interengaging a tool for turning the drill screw, and the entering end portion is disposed at the other end of the shank; the entering end portion comprises: a substantially cylindrical portion coaxial with the shank, first and second fluted surfaces inclined with respect to the center axis of the substantially cylindrical portion, the fluted surfaces having an at least in part substantially conical flute surface or being part conical, the fluted surfaces forming means effective to provide a rapid discharge of chips produced during a drilling operation in the form of a coil; and first and second inclined end surfaces, the intersection of a portion of each of the first and second fluted surfaces with a respective one of the first and second end surfaces forming respective first and second cutting edges and each of the fluted surfaces extending from the substantially cylindrical portion at least towards a respective one of the cutting edges; each of the first and second fluted surfaces forming a rake angle with a respective one of the first and second cutting edges; and each of the first and second end surfaces forming a relief angle with a respective one of the first and second cutting edges.

In an especially important embodiment of the invention the vertex of each of the first and second fluted surfaces is located beyond a first plane which is perpendicular to a second plane, the second plane being parallel to and between the first and second cutting edges, and said first plane including a center axis of said entering end portion.

In another aspect the invention provides such a drill screw in which each flute surface thereof comprises a substantially cylindrical flute surface parallel to the end surface, and a substantially conical flute surface smoothly contiguous with the substantially cylindrical flute surface, the cylindrical flute surface intersecting the end surface so that the intersection will provide a cutting edge, the cylindrical flute surface forming a rake angle with respect to the cutting edge and the end surface forming a relief angle with respect to the cutting edge.

In still another aspect of the invention, there is provided such a drill screw in which each flute surface thereof comprises a plane surface and a substantially conical flute surface contiguous with the plane surface, the plane surface intersecting the end surface so that the intersecting will provide a cutting edge, the plane surface forming a rake angle and the end surface forming a relief angle with respect to the cutting edge.

The entering end portion of a drill screw is constructed to have the aforesaid features. By virtue of these features, it is possible to design the entering end portion such that a relatively large value is given to the rake angle by utilizing the conical flute surface, cylindrical flute surface or plane surface. Thus the entering end portion of the aforesaid construction offers the advantage that it has a superb drilling ability and requires a thrust of a low value in the use.

In the preferred embodiment the flute surfaces are conical and by changing, the rake angle formed by the conical flute surface with the end surface, it is possible to select a rake angle of any value as desired.

The fact that the rake angle can be formed to have any value as desired makes it possible to use the drill screw with the entering end portion according to the invention with a high degree of efficiency when a workpiece to be fastened in place is formed of a material in which it is hard to form a hole such as stainless steel.

Chips produced during the drilling of a workpiece are smoothly discharged along the flutes which increase in width in going away from the center axis of the entering end portion because the flutes are formed on conical flute surfaces. Thus, even if a workpiece is formed of a viscous or malleable material such as aluminium or stainless steel, there is no risk of the flutes being obturated by chips and the drill screw can readily penetrate the workpiece and fasten same in place. The drill screw according to the invention can be readily produced by pinch pointing, so that manufacturing cost is much lower than in drill screws produced by machining.

BRIEF DESCRIPTION OF THE DRAWINGS

Additional and other objects, features and advantages of the invention will become apparent from the description set forth hereinafter when considered in conjunction with the accompanying drawings, in which.

DESCRIPTION OF THE PREFERRED EMBODIMENTS

Figure 1:
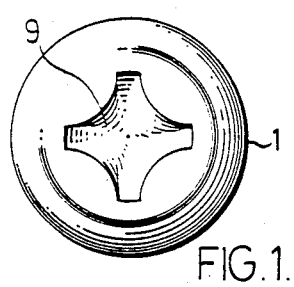
FIG. 1 is an end view of the drill screw comprising one embodiment of the invention, as seen downwardly from the head.
Figure 2:
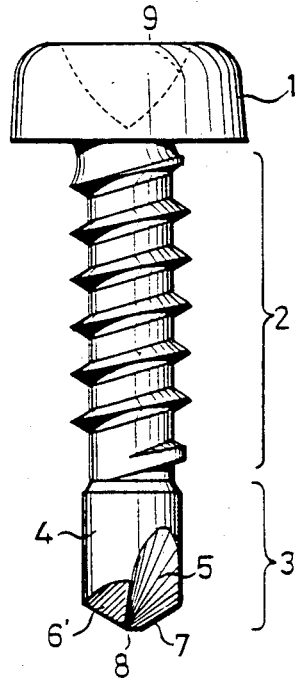
FIG. 2 is a front view of the drill screw shown in FIG. 1.

Preferred embodiments of the invention will now be described by referring to the accompanying drawings. In FIGS. 1 and 2, the drill screw includes a head 1, a shank 2 provided with helical threads capable of forming female threads in a workpiece, and an entering end portion 3. The head 1 is provided with means such as a cross-recess 9, for interengaging a tool for turning the screw. The helical threads in the shank 2 have a substantially uniform outer diameter and a substantially uniform root diameter. The entering end portion 3 includes a cylindrical portion 4 of a diameter which has a predetermined value relative to the diameter of the shank 2, two flute surfaces 5 and 5' disposed near the forward end of the cylindrical portion 4, the flute surfaces 5 and 5' being inclined with respect to the center axis of the entering end portion and disposed on opposite sides of such center axis, and two end surfaces 6 and 6' forming an intersection on the center axis of the entering end portion in the shape of a roof.

Figure 5:
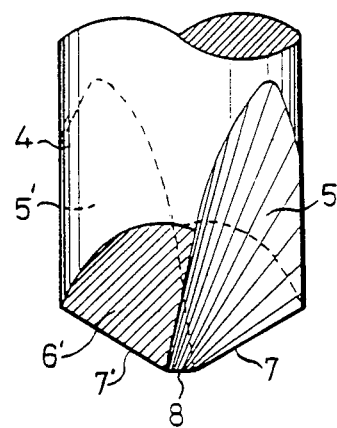
FIGS. 5 and 6 are a front view and an end view respectively of the entering end portion of the drill screw.
Figure 6:
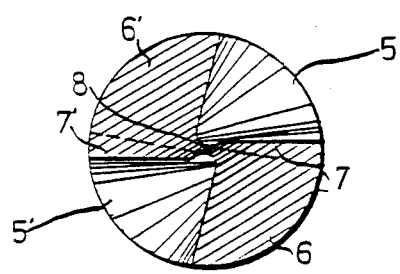
Figure 7:
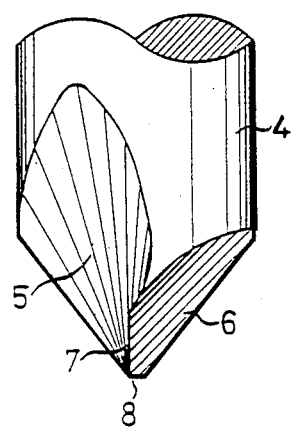
FIG. 7 is a side view of the entering end portion.

As shown in FIGS. 5, 6 and 7, the drill screw has conical flute surfaces 5 and 5' and end surfaces 6 and 6'.

A cutting edge 7 is formed as a ridge disposed at the intersection of the conical flute surface 5 and the end surface 6. The end surface 6 forms a relief angle of a suitable value with respect to the cutting edge 7.

A conical flute surface 5' and an end surface 6' which are symmetrical with and opposed to the flute surface 5 and the end surface 6, respectively, with respect to the center axis of the entering end portion 3 form therebetween a cutting edge 7' in the same manner as the flute surface 5 and the end surface 6 form the cutting edge 7 therebetween. The two end surfaces 6 and 6' are adjacent each other in the center of the entering end portion 3 and form a ridge 8 of a small length, as shown in FIG. 6, which functions as a chisel.

In operation, the entering end portion 3 readily bites into a workpiece 11 (FIG. 8) and forms a hole therein with a thrust of a small magnitude by virtue of the conical rake surfaces. Stated differently, the entering end portion according to the invention is keen edged. Chips produced during a drilling operation performed on the workpiece can be discharged in the form of a coil 10 as shown in FIG. 8 or in pieces along the flutes on the flute surfaces 5 and 5' which are increased in width in going away from the center axis of the entering end portion 3 because flutes are formed on the conical flute surfaces.

Figure 8:
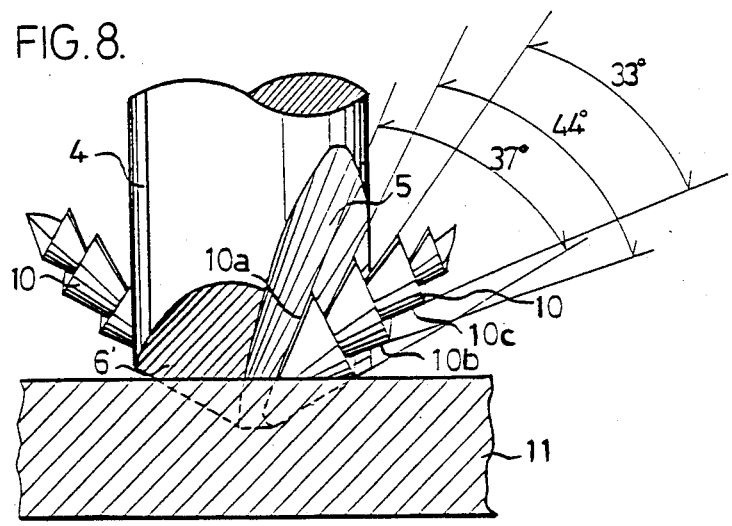
FIG. 8 is a view showing the entering end portion performing a drilling operation.

As is shown in new FIG. 8, coil 10 has a continuous conical form, coil portions 10a, 10b and 10c of which have a conical angle of 37°, 44° and 33° respectively. It has been found that the conical angle of chips produced in the most speedy drilling condition is about 37° and the vertex angle of the flutes is suitably larger than the conical angle of chips by 5–10 degrees for maintaining the strength of the entering end portion 3 of the drill screw and for easily discharging chips in a coil 10.

As the conical angle of the coil 10 changes owing to the rake angle and material to be drilled, the vertex angle of each conical flute surface may be preferably 35°–54°.

The discharge of chips in the form of a conical coil as shown in FIG. 8 ensures a rapid discharge of great quantities of chips which permits greater drilling speeds.

Figure 9:
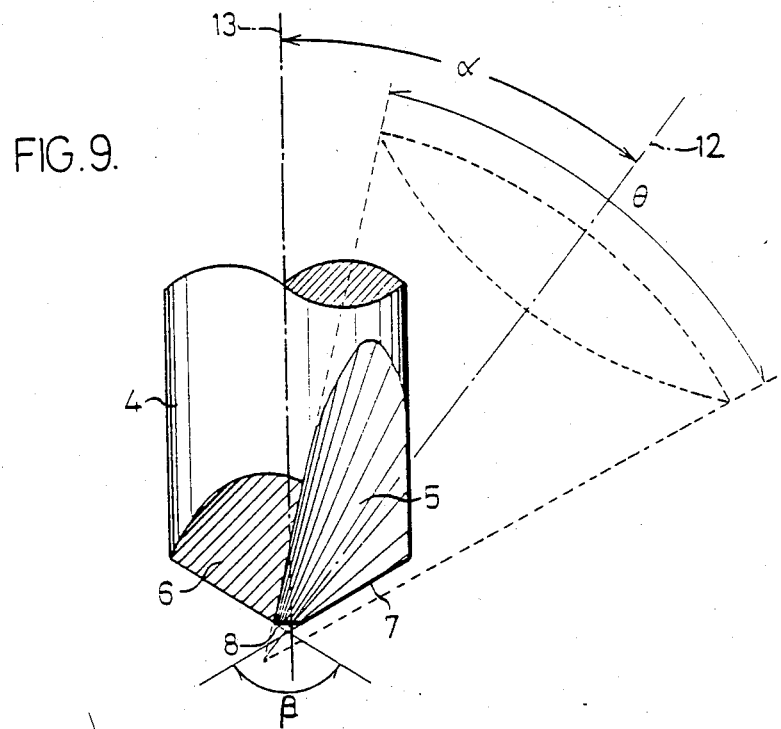
FIGS. 9 and 10 are a front view and a side view respectively in explanation of the flute surface.
Figure 10:
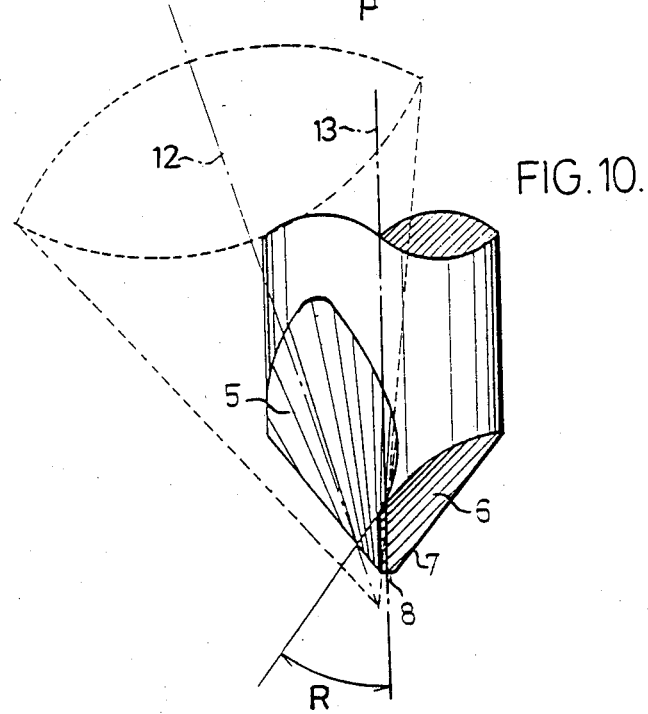

As shown in FIG. 9, the center axis 12 of each conical flute surface 5 and 5' intersects the center axis 13 of the entering end portion 3 at an angle $\alpha$ which is smaller than half the angle $\beta$ between the cutting edges at the tip of the entering end portion 3. The vertex angle $\theta$ of each conical flute 5 is within the range of 35°–54°; the vertex of each conical flute surface 5, 5' being located beyond a first plane which is perpendicular to a second plane, the second plane being parallel and between the cutting edges 7, 7', and the first plane including center axis 13 of the entering end portion 3. As shown in FIG. 10, the center axis 12 of the cone does not come into contact with the center axis 13 of the entering end portion 3 and is slightly out of the extension of the center axis. Also, the cone has a vertex which, as shown in FIG. 10, is disposed in front of the ridge 8 as seen in the direction of penetration of the entering end portion 3. The end surface 6 forms a relief angle of a suitable value with respect to the cutting edge 7.

The drill screw of the invention is superior to prior drill screws discharging chips produced during the drilling of a workpiece in the form of a coil, which results in a rapid drilling speed and, therefore, a speedup of the screw fastening operation. In particular, a drill screw in accordance with the invention will penetrate a malleable workpiece without jamming.

Drill screws may form chips in various forms including powder form, needles, flakes, coils and tapes. In accordance with the present invention, it has been found that formation of the chips as a conical spiral, by means of the drill screw of the invention having conical flutes, avoids jamming, the operation is faster and a lighter thrust is required.

Figure 3:
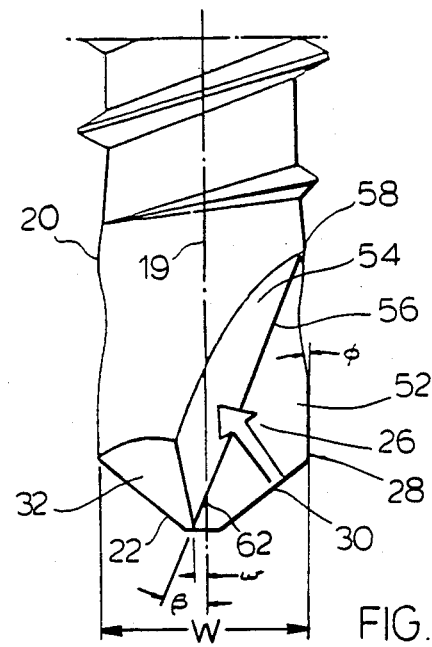
FIG. 3 is a front view of a prior art drill screw.
Figure 4:
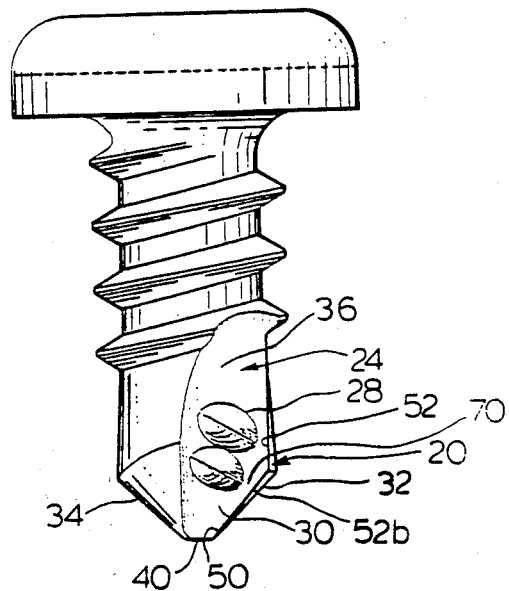
FIG. 4 is a front view of another prior art drill screw.

Prior art drill screws are illustrated in FIGS. 3 and 4 of the drawings. In particular FIG. 4 shows a drill screw of Sygnator in U.S. Pat. No. 3,786,713.

Sygnator shows concave flute surfaces which are interrupted by discrete radially outwardly extending obstructions for breaking the chips into small pieces.

The concave flute surfaces of Sygnator are not conical and, therefore, there is no apex of conical flute surface in Sygnator. In accordance with the present invention the vertex of each of the conical flute surfaces is located beyond or outside a first plane containing the center axis of the drill screw, and this results in the chip discharging space of the drill screw being large; this facilitates smooth flow of the conical chip along the flutes away from the drill screw.

When the vertices of the curved flute surfaces are located on the center axis of the drill screw, as in Sygnator, the resulting chip discharge space is small and this hinders the flow of chips away from the drill screw and jamming of the drill screw occurs. This discrete radially extending obstructions on the flute surfaces of Sygnator are presumably intended to counteract this problem by reducing the chips to a small size.

In addition the conical flutes in the drill screw suitably have a vertex angle of 35° to 54°, and produce a conical chip having a conical angle of 30° to 44°, in particular 33°, 37° or 40° and preferably 37° C.

It is desirable that the vertex of each conical flute have an angle 5° to 10° greater than the conical angle of the chip to provide a minimized extra space between the conical chips and the flute wall.

For example, if the vertex angle of each flute is 37°, a chip having a conical angle of 37° will rub against the flute wall. The most suitable angle for the vertex of the flute to provide a superior drill screw is thus provided with the aforementioned minimized extra space between the conical chips and the wall of the conical flute.

We claim:

1. A drill screw comprising a shank, a head and an entering end portion formed integrally with one another, said shank having formed thereon thread convolutions of a substantially uniform outer diameter and a substantially uniform root diameter, said head being disposed at one end of said shank and provided with means for interengaging a tool for turning the drill screw, and said entering end portion being disposed at the other end of said shank, said entering end portion comprising a cylindrical portion coaxial with said shank, said cylindrical portion being provided with two flute surfaces inclined with respect to the center axis of said cylindrical portion and disposed on sides thereof and forming means effective to provide rapid discharge of chips produced during a drilling operation in the form of a coil, and end surfaces of a roof-shape formed in said cylindrical portion, wherein the improvement resides in each of said flute surfaces including an uninterrupted and at least part substantially conical flute surface having a vertex angle of 35° to 54°, the intersection of each of said flute surfaces and each of said end surfaces forming a cutting edge, each of said at least part conical surfaces extending from said cylindrical portion at least towards a respective one of said cutting edges, and each of said flute surfaces forming a rake angle with respect to one of said cutting edges, the vertex of each of said at least in part substantially conical flute surfaces being located outside of a first plane which is perpendicular to a second plane, said second plane being parallel and between the cutting edges, and said first plane including a center axis of said entering end portion, and each of said end surfaces forming a relief angle with respect to one of said cutting edges.

2. A drill screw according to claim 1, wherein said flute surfaces are substantially conical throughout.

3. A drill screw comprising a shank, a head, and an entering end portion formed integrally with one another, wherein, the shank has formed thereon thread convolutions of substantially uniform outer diameter and substantially uniform root diameter, the head is disposed at one end of the shank and is provided with means for interengaging a tool for turning the drill screw, and the entering end portion is disposed at the other end of the shank and comprises:

a substantially cylindrical portion coaxial with the shank, first and second part-conical, fluted surfaces inclined with respect to the center axis of the substantially cylindrical portion and forming means effective to provide rapid discharge of chips produced during a drilling operation in the form of a coil, said first and second part conical surfaces each having a vertex angle of 35° to 54°, and first and second inclined end surfaces, the intersection of a portion of each of the first and second part-conical, fluted surfaces with a respective one of the first and second end surfaces forming respective first and second cutting edges and each of said part-conical fluted surfaces extending from said substantially cylindrical portion at least towards a respective one of said cutting edges such that:

(I) each of the first and second part-conical fluted surfaces forms a rake angle with a respective one of the first and second cutting edges;

(II) each of the first and second end surfaces forms a relief angle with a respective one of the first and second cutting edges; and (III) the vertex of each of the first and second part-conical fluted surfaces is located beyond a first plane which is perpendicular to a second plane, the second plane being parallel and between the first and second cutting edges, and said first plane including a center axis of said entering end portion.

4. A drill screw comprising a shank, a head and an entering end portion formed integrally with one another, said shank having formed thereon thread convolutions of a substantially uniform outer diameter and a substantially uniform root diameter, said head being disposed at one end of said shank and provided with means for interengaging a tool for turning the drill screw, and said entering end portion being disposed at the other end of said shank, said entering end portion comprising a cylindrical portion coaxial with said shank, said cylindrical portion being provided with two flute surfaces inclined with respect to the center axis of said cylindrical portion and disposed on opposite sides thereof, and end surfaces of a roof-shape formed in said cylindrical portion, said flute surfaces being substantially conical uninterrupted surfaces and forming means effective to provide rapid discharge of chips produced during a drilling operation in the form of a coil, the intersection of each of said flute surfaces and each of said end surfaces forming a cutting edge, each of said at least part-conical surfaces extending from said cylindrical portion at least towards a respective one of said cutting edges, each of said flute surfaces forming a rake angle with respect to one of said cutting edges and each of said end surfaces forming a relief angle with respect to one of said cutting edges, said substantially conical flute surfaces each having a vertex angle of 35° to 54°.

5. A drilling screw according to claim 4, wherein the vertex of each of said conical flute surfaces is located outside a first plane which is perpendicular to a second plane, said second plane being parallel and between the cutting edges and said first plane including a centre axis of said entering end portion.

6. A drill screw according to claim 5, wherein said entering end portion terminates in a ridge and the vertex of each of said conical flute surfaces is disposed beyond said ridge.

* * * * *